United States Patent
Coutant et al.

[11] Patent Number: 5,890,981
[45] Date of Patent: Apr. 6, 1999

[54] HYDROMECHANICAL TRANSMISSION HAVING THREE PLANETARIES AND FIVE MEMBERS

[75] Inventors: Alan R. Coutant, Chillicothe; Stephen C. Garnett, Princeville; Eric D. Stemler, Peoria, all of Ill.

[73] Assignee: Caterpillar Inc., Peoria, Ill.

[21] Appl. No.: 755,772

[22] Filed: Nov. 25, 1996

[51] Int. Cl.⁶ .................................................. F16H 47/04
[52] U.S. Cl. .................................................. 475/72; 475/74
[58] Field of Search ................................. 475/72, 74, 78, 475/82

[56] References Cited

U.S. PATENT DOCUMENTS

| | | | |
|---|---|---|---|
| 3,969,958 | 7/1976 | Miyao et al. | 475/82 |
| 5,113,723 | 5/1992 | Ishino et al. | 475/72 X |
| 5,129,867 | 7/1992 | Fredrikson et al. | 475/74 X |
| 5,156,577 | 10/1992 | Fredrikson et al. | 475/74 |
| 5,159,855 | 11/1992 | Nikolaus et al. | 475/78 X |
| 5,248,283 | 9/1993 | Eckhardt et al. | 475/72 |
| 5,466,197 | 11/1995 | Mitsuya et al. | 475/72 |
| 5,667,452 | 9/1997 | Coutant | 475/72 X |

FOREIGN PATENT DOCUMENTS

WO 91/01460  2/1991  WIPO .

*Primary Examiner*—Dirk Wright
*Assistant Examiner*—Peter T. Kwon
*Attorney, Agent, or Firm*—Calvin E. Glastetter

[57] ABSTRACT

A hydromechanical transmission includes a hydrostatic transmission, a mechanical transmission having a planetary gearing mechanism, both being driven by an engine. The output of the hydrostatic transmission interacts with the mechanical transmission to provide infinitely adjustable power flow through the hydromechanical transmission. The planetary gearing mechanism includes three planetary gear set and five members to connected the hydromechanical transmission to an output.

13 Claims, 11 Drawing Sheets

HYDROMECHANICAL TRANSMISSION HAVING THREE PLANETARIES AND FIVE MEMBERS

TECHNICAL FIELD

This invention relates generally to a hydromechanical transmission and more particularly to a planetary gear mechanism having three planetary gear sets and five members.

BACKGROUND ART

In a machine, such as a wheel loader or track type tractor, for example, an engine supplies power for propelling the machine in the forward or reverse directions as well as supply power for machine implements. A transmission is coupled to the engine and transmits power from the engine to the drivetrain to propel the machine. It is desirable to utilize a continuously variable transmission and manage the transmission ratio to thereby save engine power for the implements and also to provide a continuously variable power flow through the transmission to improve machine productivity. Because machines operate at relatively low speeds and in cyclical work routines, there is a need to control speed precisely at low speeds and to be infinitely adjustable throughout the full range. One of the problems associated with such an arrangement is to match the hydromechanical transmission arrangements to the type of work being performed by the machine.

The present invention is directed to overcoming one or more of the problems as set forth above.

DISCLOSURE OF THE INVENTION

In one aspect of the present invention a hydromechanical transmission having a hydrostatic transmission, a directional mechanism and an output is provided. The hydromechanical transmission includes a planetary gearing mechanism. A grounded clutch is engageable for providing first gear within the hydromechanical transmission. A first member of the planetary gearing mechanism is connected to the hydrostatic transmission. A second member of the planetary gearing mechanism is engageable by the grounded clutch for stopping rotation. A third member of the planetary gearing mechanism is connectable to the output. A fourth member of the planetary gearing mechanism is connectable to the directional mechanism. A fifth member of the planetary gearing mechanism is connectable to the output.

BEST MODE FOR CARRYING OUT THE INVENTION

Figure 1:
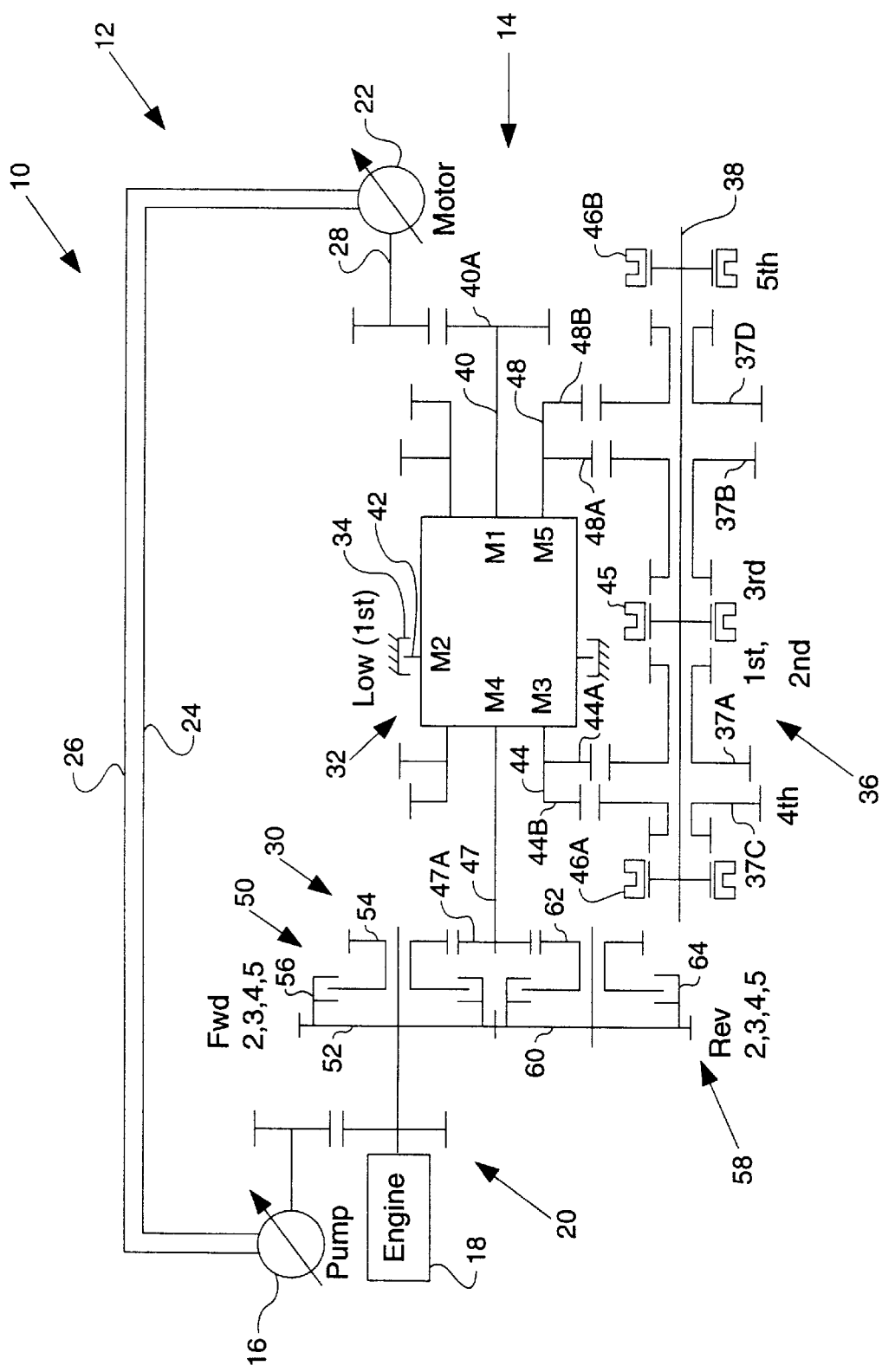
FIG. 1 is a schematic view of a transmission showing the present invention of five members of the planetary arrangement.

Referring to FIG. 1, a hydromechanical transmission arrangement 10 includes a hydrostatic transmission 12 and a mechanical transmission 14. The hydromechanical transmission is used to propel a machine, not shown. The hydrostatic transmission 12 includes a variable displacement pump 16 drivingly connected to an engine 18 through a pump drive arrangement 20. A motor 22 is fluidly connected to the pump 16 through conduits 24,26. The hydrostatic transmission can use a variable displacement motor or a fixed displacement motor without departing from the scope of the invention. An electric generator and electric motor could also be used in place of the hydraulic pump and motor without departing from the scope of the invention. An output shaft 28 extends from the motor 22 and is operative to transmit torque therefrom.

The mechanical transmission 14 includes a directional mechanism 30, a planetary gearing mechanism 32, a grounded clutch 34 associated with the planetary gearing mechanism 32, and a gear change mechanism 36 having an output 38. The gear change mechanism 36 controls the ratio of the transmission by movement of shift collars or clutches to connect a plurality of gears 37A,37B,37C,37D to the output 38. A first member 40 of the planetary gearing mechanism 32 is drivingly connected by a gear 40A to the output shaft 28 of the motor 22. A second member 42 of the planetary gearing mechanism 32 is engageable by the grounded clutch 34 for stopping rotation when the grounded clutch 34 is engaged. A third member 44 of the planetary gearing mechanism 32 includes a gear 44A and a gear 44B connectable through the gear change mechanism 36 to the output 38 by movement of a first shift collar 45 or a second shift collar 46A. A fourth member 47 of the planetary gearing mechanism 32 includes a gear 47A drivingly connected to the engine 18 through the directional mechanism 30. A fifth member 48 of the planetary gearing mechanism 32 includes a gear 48A and a gear 48B connectable to the output 38 through the gear change mechanism 36 by movement of the first shift collar 45 or a third shift collar 46B. The members 40,42,44,47,48 can each comprise one or more elements of the planetary gearing mechanism 32 and any associated gears which are connected together to function as one member.

An example of the directional mechanism 30 is shown as being connected to the fourth member 47. The directional mechanism 30 includes a first gear mechanism 50 having an input 52 drivingly connected to the engine 18 and an output 54 with a first fluid operated directional clutch 56 disposed therebetween. When the first clutch 56 and any one of the shift collars 45,46A,46B are engaged a forward direction of the machine is achieved. A second gear mechanism 58 has an input 60 drivingly connected to the engine 18 and an output 62 with a second fluid operated directional clutch 64 disposed therebetween. When the second clutch 64 and any one of the shift collars 45,46A,46B are engaged a reverse direction of the machine is achieved. When both clutches 56,64 are disengaged the directional mechanism 30 is in neutral with no power being transmitted from the directional mechanism 30 to the planetary gearing mechanism. Other types of directional mechanisms could be used without departing from the scope of the invention.

Figure 2:
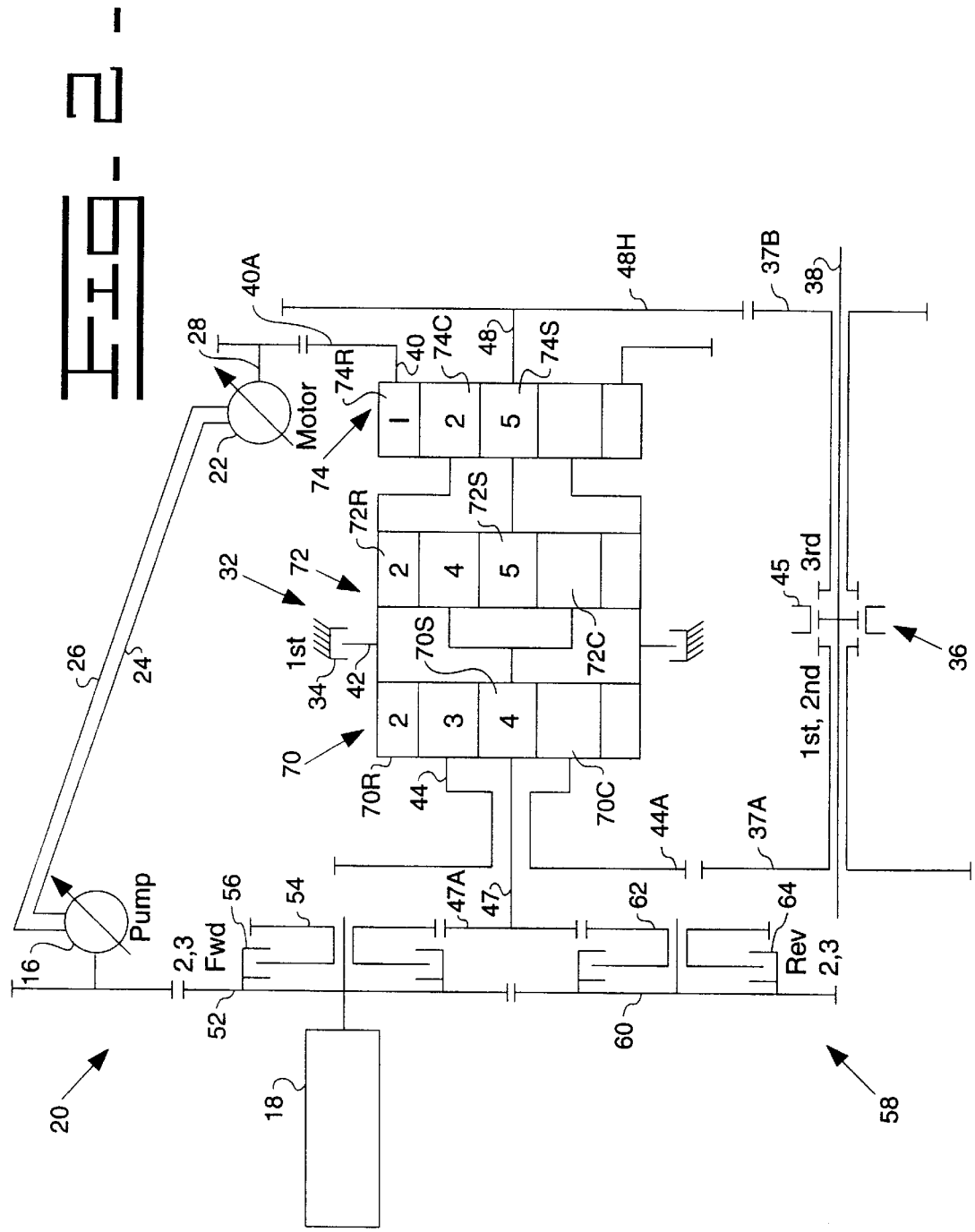
FIG. 2 is a schematic view of a transmission arrangement showing the five members of the three planetaries of the planetary arrangement.

Now referring to FIG. 2 reference numerals of components previously described will be repeated. The pump 16 and motor 22 are shown as being variable displacement. A fixed displacement motor can be substituted without departing from the scope of the invention.

The planetary gear mechanism 32 includes a first planetary gear set 70, a second planetary gear set 72 and a third planetary gear set 74. Each planetary gear set 70,72,74 includes elements such as a sun gear, a carrier with planet gears, a ring gear. The first planetary gear set 70 includes a sun gear 70S, a carrier 70C and a ring gear 70R. The second planetary gear set 72 includes a sun gear 72S, a carrier 72C and a ring gear 72R. The third planetary gear set 74 includes a sun gear 74S, a carrier 74C and a ring gear 74R. The members 40,42,44,47,48 comprise one or more elements of the planetary gear sets 70,72,74 which are connected together to function as one member. The first member 40 includes the ring gear 74R and is connected to the motor 22 for rotation with the motor 22. The second member 42 includes the ring gears 70R,72R and the carrier 74C and is engageable by the grounded clutch 34 for achieving first or low gear in the hydrostatic mode. The third member 44 includes the carrier 70C and is connected to a gear change mechanism 36 for selective connection to the output 38 by movement of the shift collar 45 in one direction. The fourth member 47 includes the sun gear 70S and the carrier 72C and is connectable to the directional mechanism 30. The fifth member 48 includes the sun gears 74S,72S and is connected to the gear change mechanism 36 for selective connection to the output 38 by movement of the shift collar 45 in the opposite direction.

Figure 3:
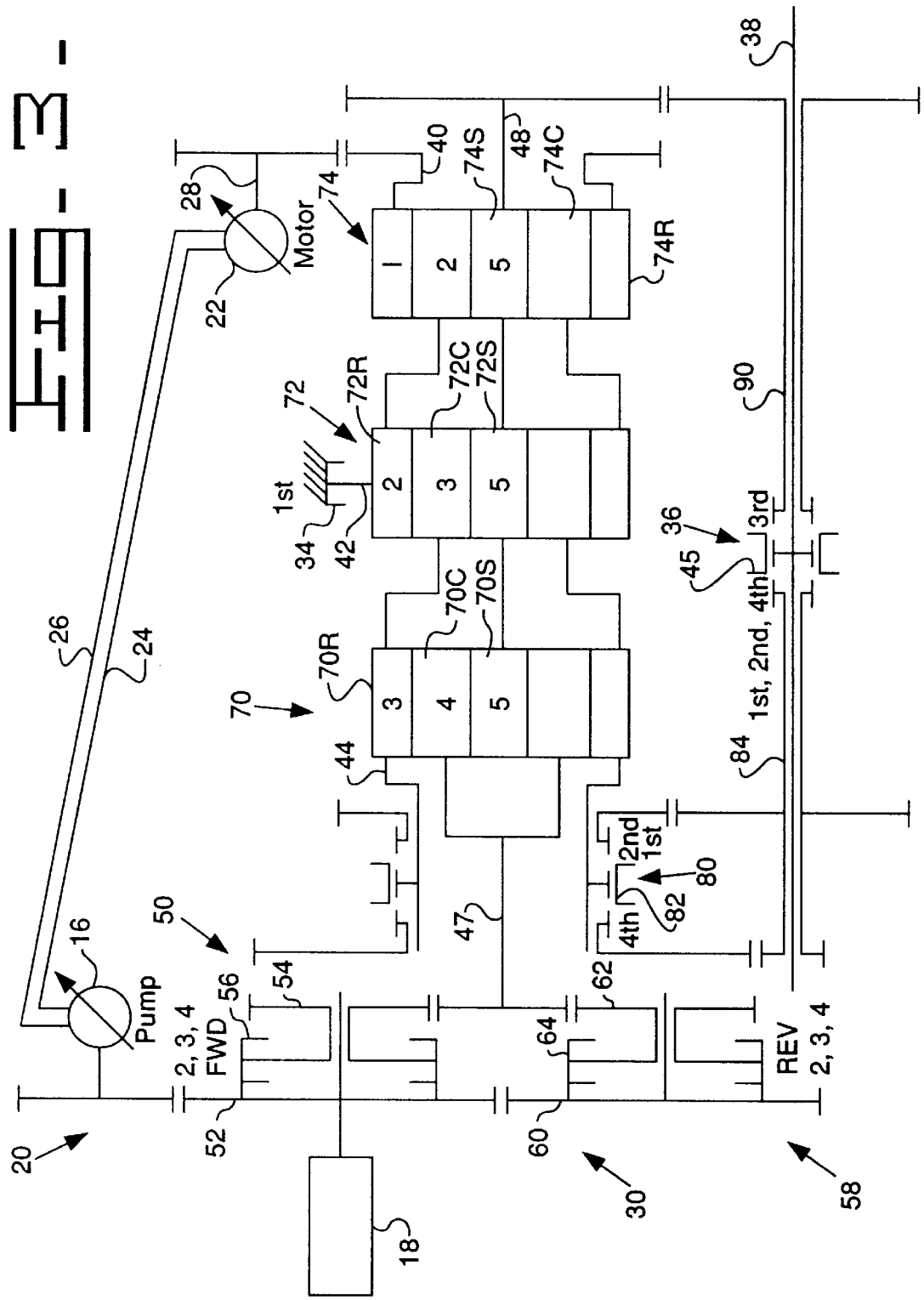
FIG. 3 is a schematic view showing an alternate transmission arrangement.

Referring to FIG. 3, the first member includes the ring gear 74R. The second member 42 includes the ring gear 72R and the carrier 74C and is engageable by the grounded clutch 34 for achieving first or low gear in the hydrostatic mode. The third member 44 includes the ring gear 70R and the carrier 72C. The fourth member 47 includes the carrier 70C. The fifth member 48 includes the sun gears 74S,72S,70S. A gear change mechanism 80 includes a sliding shift collar 82 for connecting the third member 44 to an output shaft 84. The shift collar is slideable in one direction for achieving first and second gear and in the other direction for achieving fourth gear. The shift collar 45 of the gear change mechanism 36 connecting the output shaft 84 or an output shaft 90 to the output shaft 38. The shift collar 45 is slideable in one direction for achieving third gear and in the other direction for achieving first, second and fourth gears as selected by the shift collar 82. Although shift collars are shown and described for selecting gears, it is recognized that a clutch or and other suitable means could be used without departing from the scope of the invention.

Figure 4:
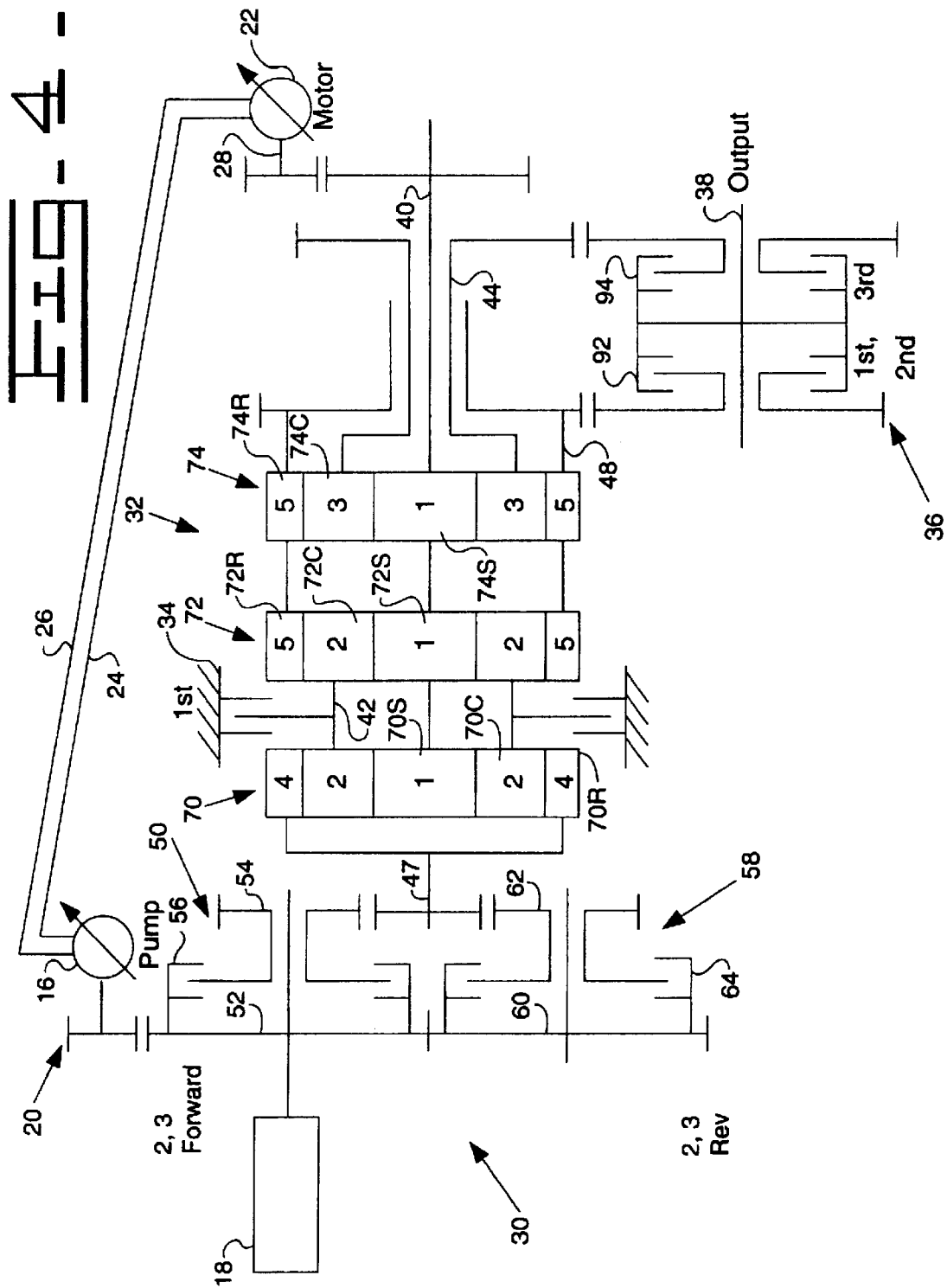
FIG. 4 is a schematic view showing an alternate transmission arrangement.

Referring to FIG. 4, The first member 40 includes the sun gears 74S,72S and 70S and is connected to the motor 22 for rotation with the motor 22. The second member 42 includes the carriers 70C,72C and is engageable by the grounded clutch 34 for achieving first or low gear in the hydrostatic mode. The third member 44 includes the carrier 74C and is connected the gear change mechanism 36. The fourth member 47 includes the ring gear 70R and is connectable to the directional mechanism 30. The fifth member 48 includes the ring gears 74R,72R and is connected to the gear change mechanism 36. A first output clutch 92 is engageable to connect the fifth member 48 to the output 38 for first and second gear. A second output clutch 94 is engageable to connect the third member 44 to the output 38 for third gear.

Figure 5:
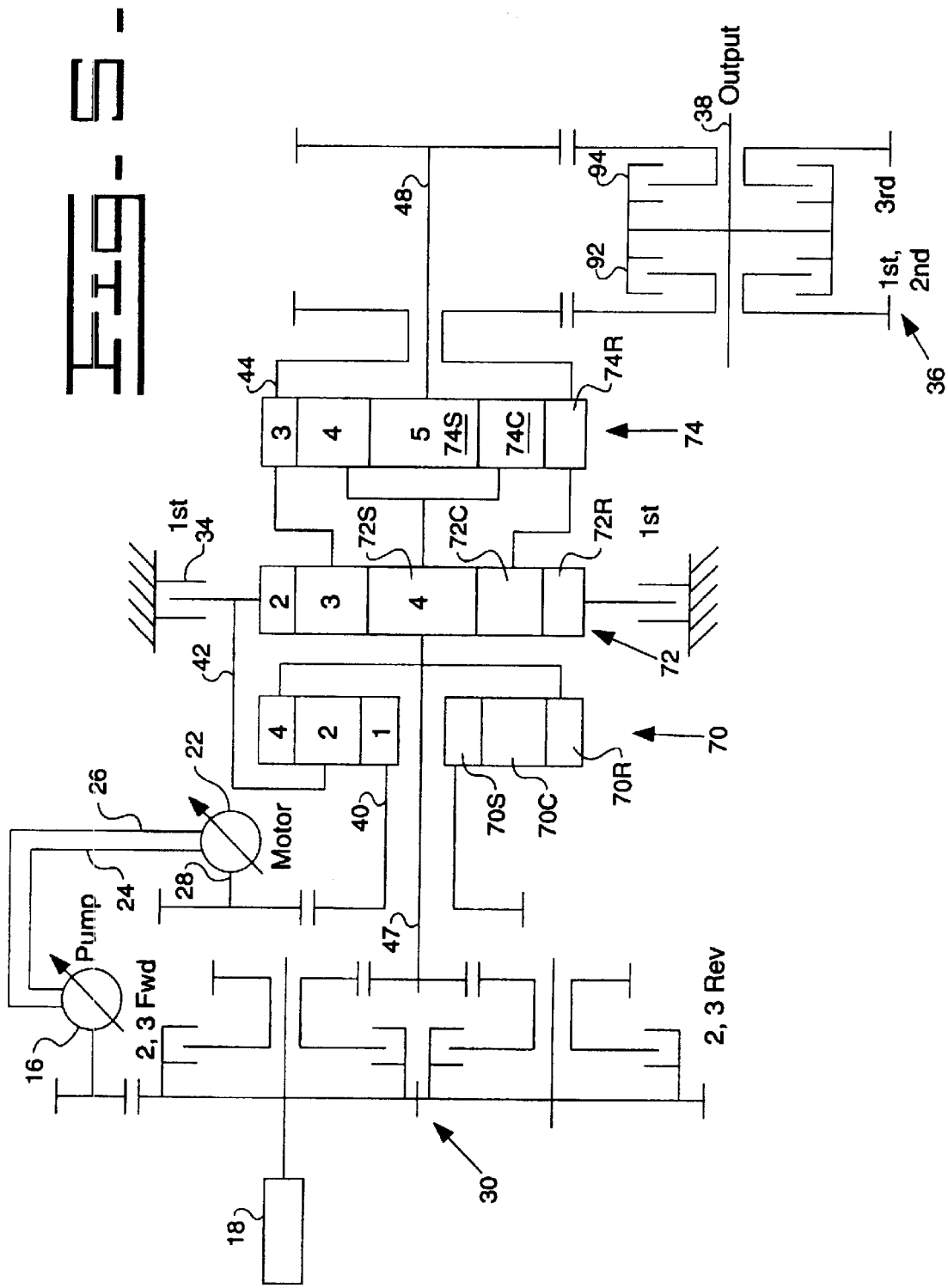
FIG. 5 is a schematic view showing an alternate transmission arrangement.

Referring to FIG. 5, the first member includes the sun gear 70S and is connected motor 22. The second member 42 includes the carrier 70C and the ring gear 72R and is engageable by the grounded clutch 34 for achieving first or low gear in the hydrostatic mode. The third member 44 includes the ring gear 74R, the carrier 72C and is selectively connected to the output 38 by the clutch 92 of the gear change mechanism 36. The fourth member 47 includes the ring gear 70R, the sun gear 72S, the carrier 74C and is connectable to the directional mechanism 30. The fifth member 48 includes the sun gear 74S and is selectively connected to the output 38 by the engagement of the clutch 94.

Figure 6:
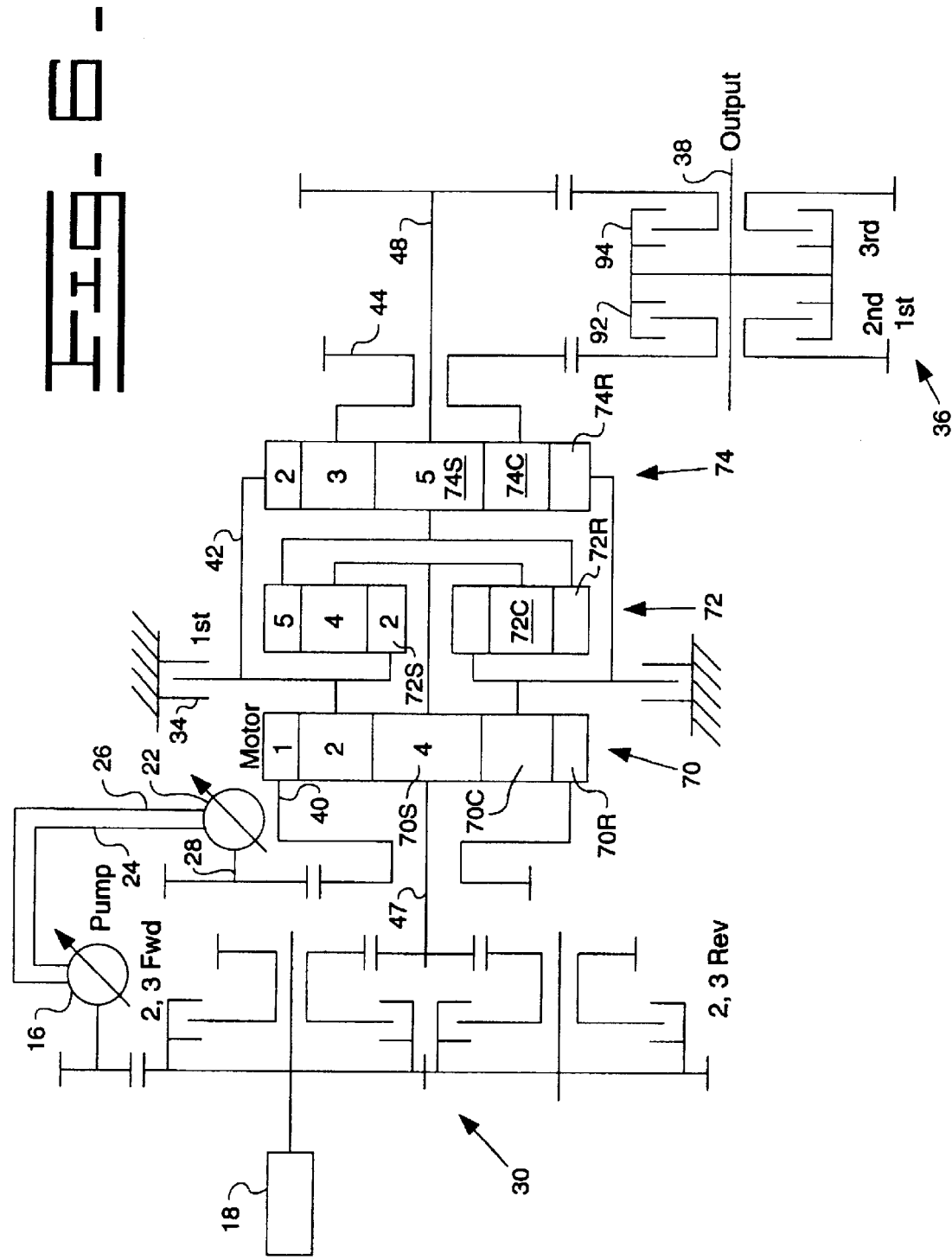
FIG. 6 is a schematic view showing an alternate transmission arrangement.

Referring to FIG. 6, the first member 40 includes the ring gear 70R and is connected to the motor 22 for rotation with the motor 22. The second member 42 includes the carrier 70C, the sun gear 72S, the ring gear 74R and is engageable by the grounded clutch 34 for achieving first or low gear in the hydrostatic mode. The third member 44 includes the carrier 74C and is selectively connected to the output 38 by the clutch 92. The fourth member 47 includes the sun gear 70S, the carrier 72C and is connectable to the directional mechanism 30. The fifth member 48 includes the sun gear 74S, the ring gear 72R and is selectively connected to the output 38 by the clutch 94 of the gear change mechanism 36.

Figure 7:
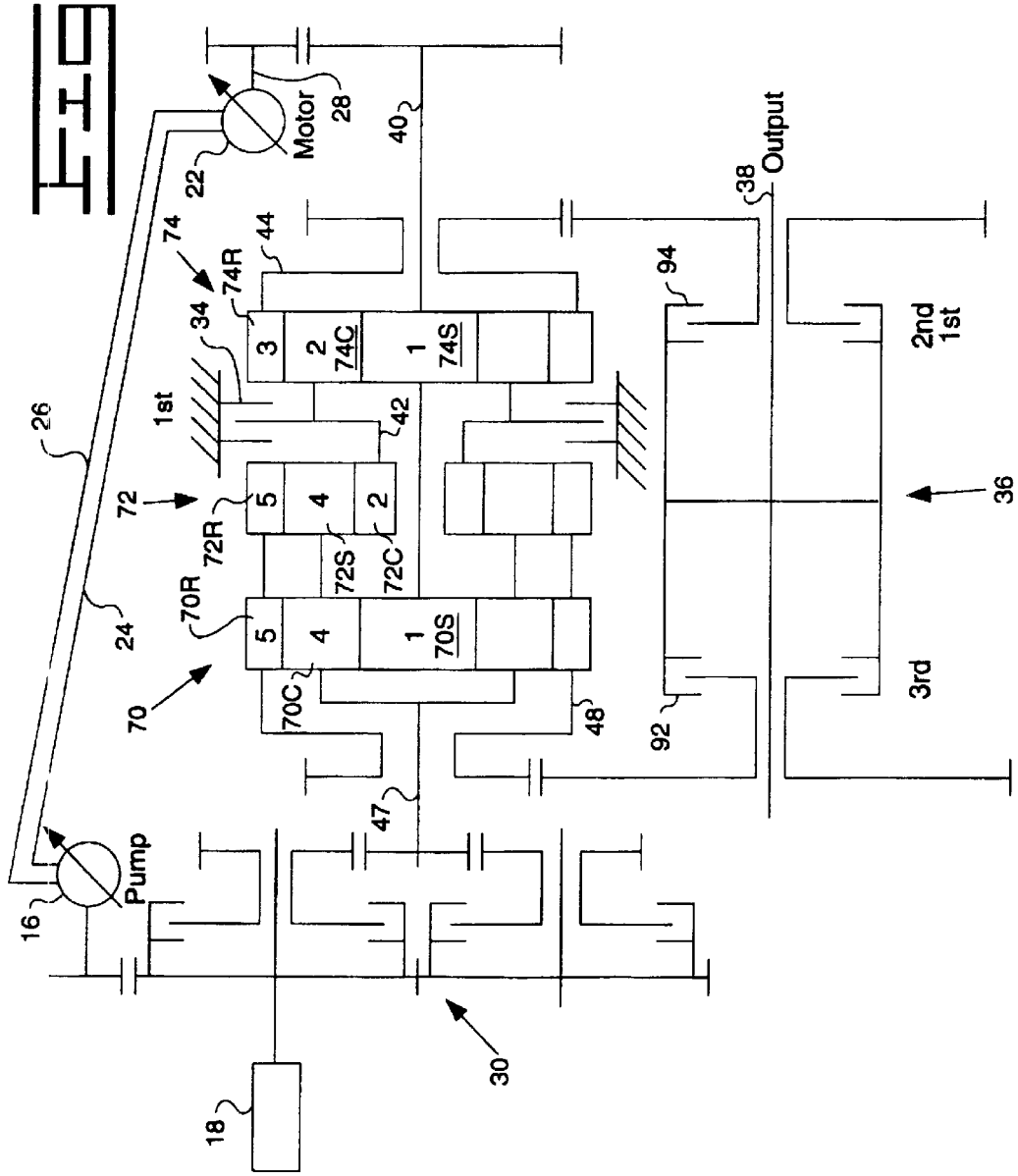
FIG. 7 is a schematic view showing an alternate transmission arrangement.

Referring to FIG. 7, the first member 40 includes the sun gears 74S,70S and is connected to the motor 22. The second member 42 includes the sun gear 72S, the carrier 74c and is engageable by the grounded clutch 34 for achieving first or low gear in the hydrostatic mode. The third member 44 includes the ring gear 74R and is selectively connectable to the output 38 by engagement of the clutch 94 to achieve first and second gear. The fourth member 47 includes the carriers 70C,72C and is connectable to the directional mechanism 30. The fifth member 48 includes the ring gears 70R,72R and is selectively connectable to the output 38 by engagement of the clutch 92 to achieve third gear.

Figure 8:
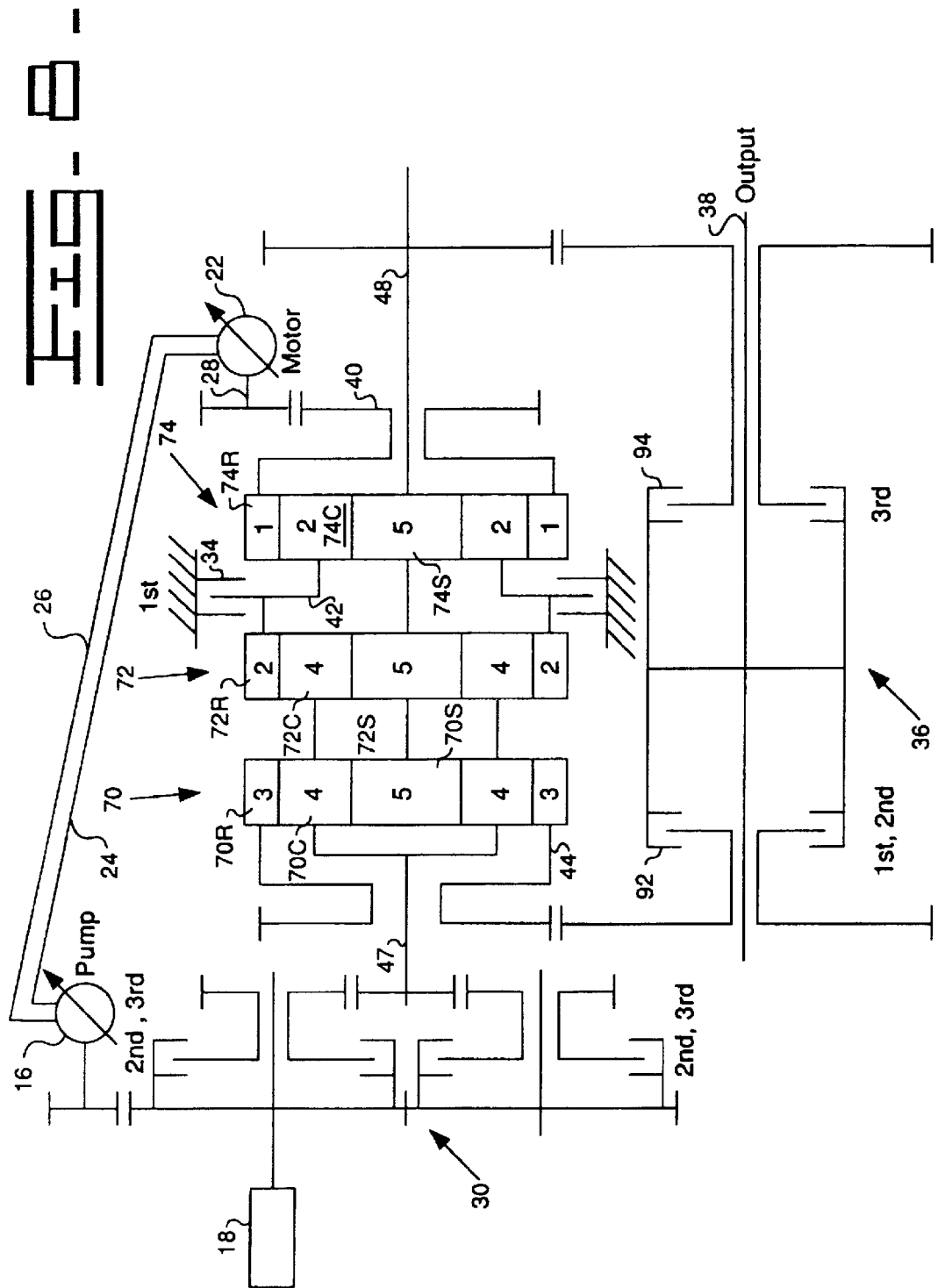
FIG. 8 is a schematic view showing an alternate transmission arrangement.

Referring to FIG. 8, the first member 40 includes the ring gear 74R and is connected to the motor 22. The second member 42 includes the ring gear 72R, the carrier 74C and is engageable by the grounded clutch for achieving first or low gear in the hydrostatic mode. The third member 44 includes the ring gear 70R and is selectively connectable to the output 38 by engagement of the clutch 92 to achieve first and second gear. The fourth member 47 includes the carriers 70C,72C and is connectable to the directional mechanism 30. The fifth member 48 includes the sun gears 74C,72C, 70C and is selectively connectable to the output 38 by the engagement of the clutch 94 to achieve third gear.

The particular arrangement or connections of the members to be used is dependent on the type of machine the transmission is to be used on, the side of the transmission where the inputs and outputs are located and the ease in connecting the elements to form the members.

Figure 9:
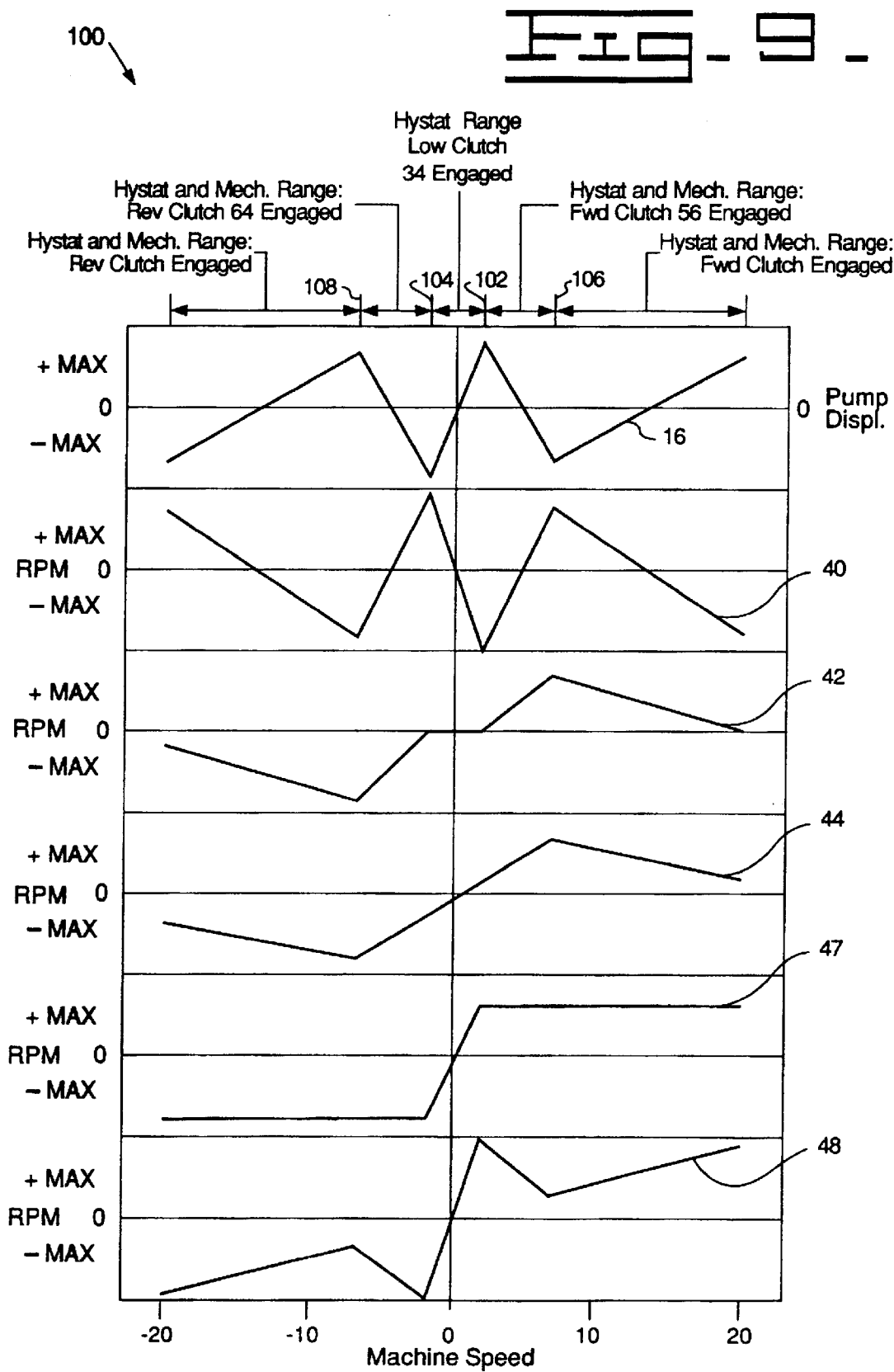
FIG. 9 is a schematic representation of a graph showing the change in the various components relative to machine speed.
Figure 10:
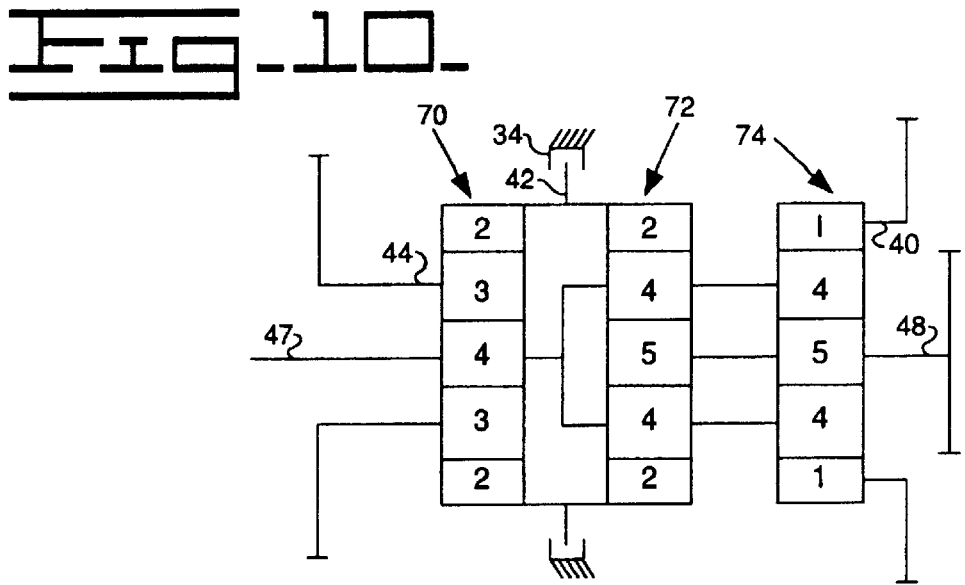
FIGS. 10–14 are schematic representations of various connections of the planetaries.
Figure 11:
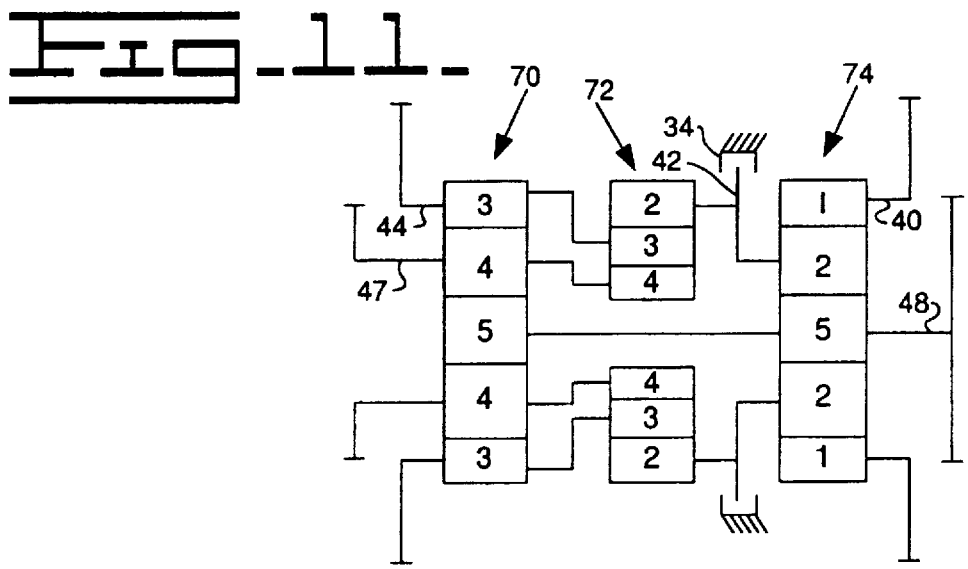
Figure 12:
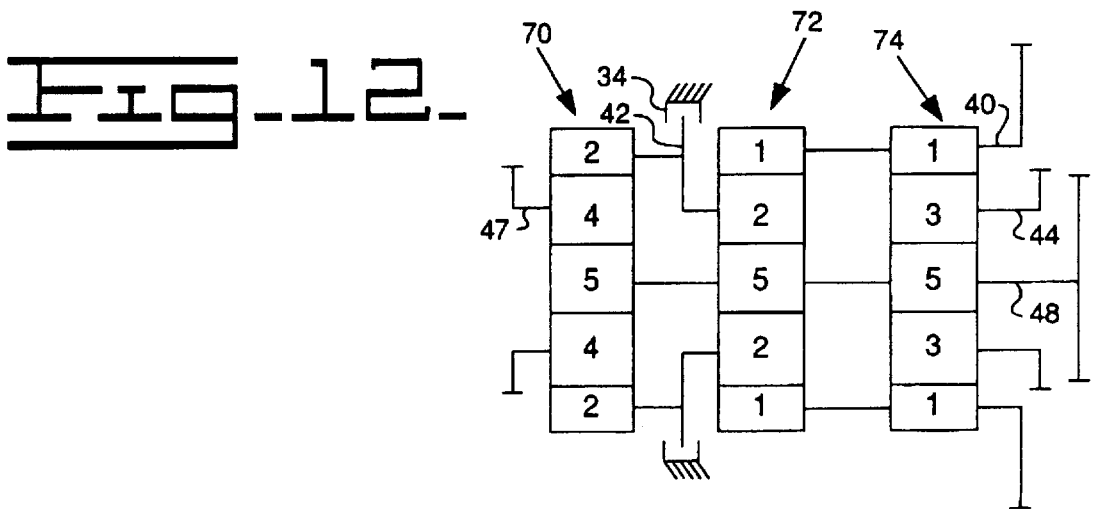
Figure 13:
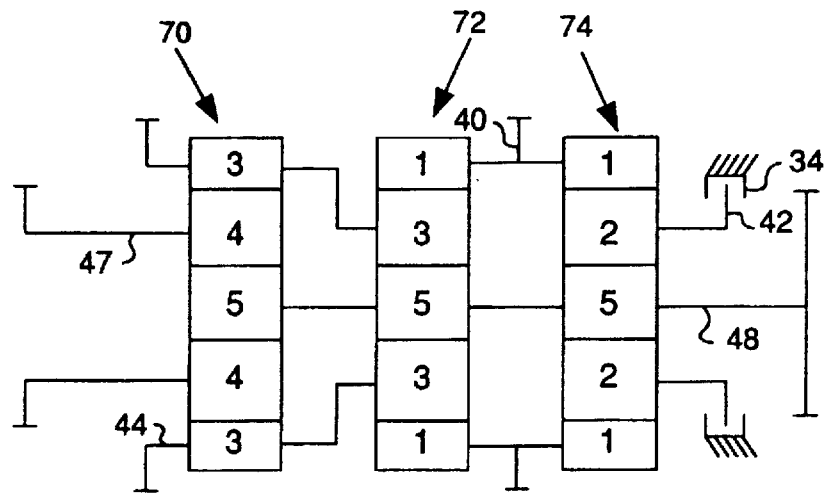
Figure 14:
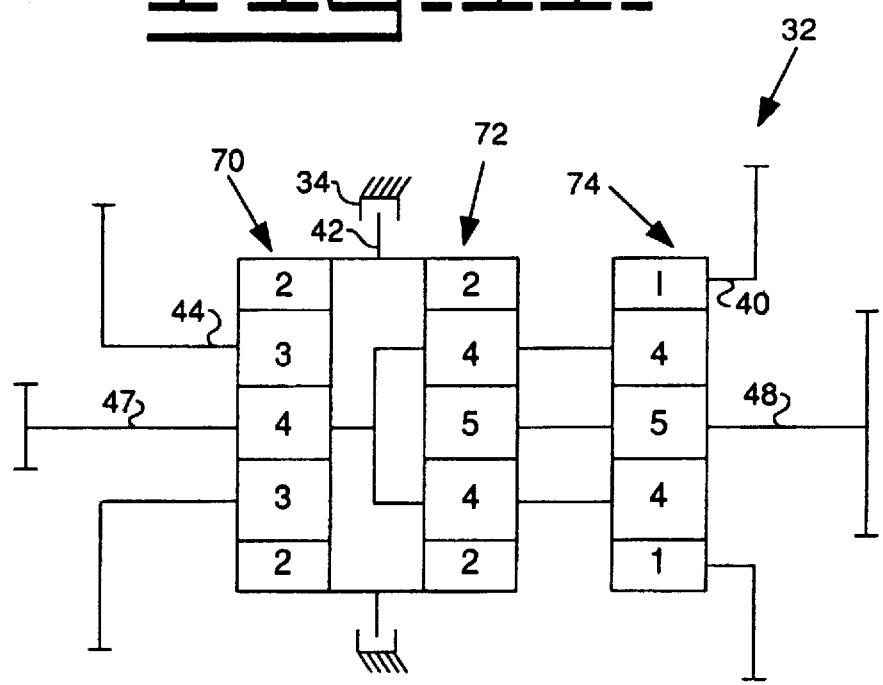

Referring to FIG. 9, a graph 100 discloses the changes in the pump 16 and the various members 40,42,44,47,48 as the machine speed increases from a stop until maximum speed is achieved in both forward and reverse direction. The graph 100 shows the changes to the various members with an example of a general connection as shown in FIGS. 1 and 2. The grounded clutch 34 for first or low gear is disengaged and the high forward directional clutch 56 is engaged at line 102. The grounded clutch 34 for first or low gear is disengaged and the high reverse directional clutch 64 is engaged at line 104. At lines 106,108 the shift collar 45 is moved the opposite direction to shift to a higher gear. A plurality of data lines 16,40,42,44,47,48 on the graph 100 have reference numerals corresponding to the reference numerals of the pump 16 and the five members 40,42,44,47,48. The line 16 represents the displacement of the pump 16. The line 40 represents the speed of the first member 40 as machine speed increases. The line 42 represents the speed of the second member 42 as machine speed increases. The line 44 represents the speed of the third member 44 as machine speed increases. The line 47 represents the speed of the fourth member 47 as machine speed increases. A line 48 represents the speed of the fifth member 48 as machine speed increases.

Referring to FIGS. 10–14 alternate connections of the three planetaries are disclosed. The five members 40,42,44, 47,48 are connected to various elements of the three planetary gear sets 70,72,74 to provide alternate transmission arrangements.

Industrial Applicability

In the use of the hydromechanical transmission 10 of the present invention the hydrostatic transmission 12 and the mechanical transmission interact to provide a continuously variable and efficient output which enables the engine 18 to operate at its best efficiency.

In operation of the hydromechanical transmission 10 of the subject invention, with the engine operating at a predetermined speed level, the pump is at zero displacement, the clutches 34,56,64 are disengaged and the machine speed is zero. If the operator elects to move the machine forward, for example, from zero to approximately 2–3 mph, the grounded clutch 34 is engaged to hold the second member 42 at zero speed, the shift collar 45 of the gear change mechanism 36 is moved to the left to connect the third member 44 to the output 38 through the gears 44A,37A, the displacement of the pump 16 will move from the zero position to its maximum positive position to deliver pressurized fluid to the motor 22 to drive the first member, the first member 40 will go from the zero speed to its maximum negative speed, the third member 44 will go from its zero speed toward its maximum positive speed, the fourth member 47 will go from its zero speed to its maximum positive speed and the fifth member 48 will go from its zero speed toward its maximum positive speed.

At line 102, which is approximately 2–3 mph, the gear ratio between gears 47A and 54 is fixed such that they are rotating at the same speed as the clutch 56 hub. The grounded clutch 42 is disengaged and the forward clutch 56 is synchronously engaged for second gear and the shift collar 45 is maintained in the previously selected position. From line 102, 2–3 mph, to line 106, approximately 6.5–7.5 mph, the pump 16 moves from its maximum positive displacement to its maximum negative displacement, the first member 40 will go from its maximum negative speed to its maximum positive speed, the second member 42 will go from zero speed to its maximum positive speed, the third member 44 will continue to its maximum positive speed, the fourth member 47 is connected to the engine 18 by the engagement of the clutch 56 and will be maintained at its maximum positive speed which is engine speed, the fifth member 48 will go from its maximum positive speed toward its zero speed.

At line 106, the gear ratio between gear 48A and gear 37B is fixed such that the output shaft 38 and gear 37B hub are rotating at the same speed. The shift collar 45 is moved the opposite direction releasing the third member 44 from the output 38 and connecting the fifth member 48 to the output 38 for third gear, the forward clutch 56 is maintained in the engaged position, the pump displacement moves from its maximum negative position toward its maximum positive position, the first member 40 will go from its maximum positive speed toward its maximum negative speed, the second member 42 will go from its maximum positive speed towards its maximum negative speed, the third member 44 is now disconnected from the output 38 and will go from its maximum positive speed toward its negative speed, the fourth member 47 is still connected to the engine and will be maintained at its maximum positive speed, the fifth member 48 is now connected to the output 38 and will increase it positive speed.

It is recognized that the above description relates to a three speed hydromechanical transmission, however more shift collars could be used to obtain higher gears without departing from the scope of the invention. The speed of the machine can be increased from zero speed to some predetermined maximum speed level at a smooth and continuous manner. This is accomplished by the interaction of the hydrostatic transmission 12 and the mechanical transmission 14 by engaging and disengaging clutches and moving shift collars.

In the subject arrangement, the machine can be operated in reverse through the same speed ranges as set forth above with respect to operating in a forward direction. When being operated in a reverse direction the variable displacement pump 16 is stroked in the direction to provide pressurized fluid to the motor 22 in the opposite direction resulting in the machine being propelled in a reverse direction. In the reverse direction the shift collar 45 is moved to connect the third member 44 to the output 38, the grounded clutch 34 is engaged from zero speed until line 104 whereat the grounded clutch will be disengaged and the reverse clutch 64 will be engaged. At line 108 the shift collar 45 is moved in the opposite direction to disconnect the third member 44 from the output 38 and connect the fifth member 48 to the output 38.

Other aspects, objects and advantages of this invention can be obtained from a study of the drawings, the disclosure and the appended claims.

We claim:

1. A hydromechanical transmission having a hydrostatic transmission, a directional mechanism and an output, the hydromechanical transmission transmission comprising:

a planetary gearing mechanism;

a grounded clutch being engageable for providing first gear within the hydromechanical transmission transmission;

a first member of the planetary gearing mechanism connected to the hydrostatic transmission for rotation with the hydrostatic transmission;

a second member of the planetary gearing mechanism engageable by the grounded clutch for stopping rotation when the grounded clutch is engaged;

a third member of the planetary gearing mechanism connectable to the output;

a fourth member of the planetary gearing mechanism connectable to the directional mechanism; and a fifth member of the planetary gearing mechanism connectable to the output.

2. The hydromechanical transmission of claim 1 wherein the planetary gearing mechanism includes a first, second and third planetary gear set each having a sun gear, a carrier with planetary gears and a ring gear.

3. The hydromechanical transmission of claim 2 including a gear change mechanism for connecting the third and fifth member to the output.

4. The hydromechanical transmission of claim 1 wherein the first member is connected to a motor of the hydrostatic transmission.

5. The hydromechanical transmission of claim 2 wherein the first member includes the sun gears of the first, second and third planetary gear sets, the second member includes the carrier of the first and second planetary gear sets, the third member includes the carrier of the third gear set, the fourth member includes the ring gear of the first planetary gear set and the fifth member includes the ring gear of the second and third planetary gear sets.

6. The hydromechanical transmission of claim 5 including a gear change mechanism for connecting the third and fifth members to the output.

7. The hydromechanical transmission of claim 2 wherein the first member includes the ring gear of the third and second planetary gear sets, the second member includes the ring gear of the second planetary gear set and the carrier of the third planetary gear set, the third member includes the ring gear of the first planetary gear set and the carrier of the second planetary gear set, the fourth member includes the carrier of the first planetary gear set, the fifth member includes the sun gears of the first, second and third planetary gear sets.

8. The hydromechanical transmission of claim 7 including a first gear change mechanism for connecting the third and fifth members to the output, a second gear change mechanism for connecting the third member to the first gear change mechanism.

9. The hydromechanical transmission of claim 2 wherein the first member includes the ring gear of the third planetary gear set, the second member includes the ring gears of the first and second planetary gear sets and the carrier of the third planetary gear set, the third member includes the carrier of the first planetary gear set, the fourth member includes the sun gear of the first planetary gear set and the carrier of the second planetary gear set, the fifth member includes the sun gear of the third and second planetary gear sets.

10. The hydromechanical transmission of claim 2 wherein the first member includes the ring gear of the first planetary gear set, the second member includes the carrier of the first planetary gear set and the ring gear of the second planetary gear set, the third member includes the to the ring gear of the third planetary gear set and the carrier of the second planetary gear set, the fourth member includes the ring gear of the first planetary gear set, the sun gear of the second planetary gear set and the carrier of the third planetary gear set, the fifth member includes the sun gear of the third planetary gear set.

11. The hydromechanical transmission of claim 2 wherein the first member includes the ring gear of the first planetary gear set, the second member includes the carrier of the first planetary gear set, the sun gear of the second planetary gear set and the ring gear of the third planetary gear set, the third member includes the carrier of the third planetary gear set, the fourth member includes the sun gear of the first planetary gear set and the carrier of the second planetary gear set, the fifth member includes the sun gear of the third planetary gear set and the ring gear of the second planetary gear set.

12. The hydromechanical transmission of claim 2 wherein the first member includes the sun gear of the third and first planetary gear sets, the second member includes the sun gear of the second planetary gear set and the carrier of the third planetary gear set, the third member includes the ring gear of the third planetary gear set, the fourth member includes the carrier of the first and second planetary gear sets, the fifth member includes the ring gear of the first and second planetary gear sets.

13. The hydromechanical transmission of claim 2 wherein the first member includes the ring gear of the third planetary gear set, the second member includes the carrier of the third planetary gear set and the ring gear of the second planetary gear set, the third member includes the ring gear of the first planetary gear set, the fourth member includes the carrier of the first and second planetary gear sets, the fifth member includes the sun gear of the third, the second and the first planetary gear sets.

* * * * *